United States Patent
Winter et al.

(10) Patent No.: US 7,839,014 B2
(45) Date of Patent: Nov. 23, 2010

(54) PULSE-WIDTH MODULATION RECTIFIER HAVING AN EMERGENCY GENERATOR OPERATING MODE

(75) Inventors: Arnold Winter, Filderstadt (DE); Oliver Kaefer, Murr (DE); Martin Eisenhardt, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 210 days.

(21) Appl. No.: 12/092,660

(22) PCT Filed: Sep. 18, 2006

(86) PCT No.: PCT/EP2006/066460

§ 371 (c)(1),
(2), (4) Date: Aug. 14, 2008

(87) PCT Pub. No.: WO2007/051670

PCT Pub. Date: May 10, 2007

(65) Prior Publication Data

US 2009/0174254 A1   Jul. 9, 2009

(51) Int. Cl.
*B60L 1/00* (2006.01)
*B60L 3/00* (2006.01)
*H02G 3/00* (2006.01)

(52) U.S. Cl. ........................................ 307/9.1

(58) Field of Classification Search ............ 307/9.1, 307/10.1
See application file for complete search history.

(56) References Cited

U.S. PATENT DOCUMENTS 5,491,622 A    2/1996   Carosa
2004/0095790 A1   5/2004   Bakran et al.

FOREIGN PATENT DOCUMENTS

GB   2 121 557   12/1983
WO   WO 03/005551   1/2003

OTHER PUBLICATIONS

International Search Report, PCT International Patent Application No. PCT/EP2006/066460, dated Jan. 9, 2007.

*Primary Examiner*—Jared J Fureman
*Assistant Examiner*—Carlos Amaya
(74) *Attorney, Agent, or Firm*—Kenyon & Kenyon LLP

(57) ABSTRACT

A pulse-width rectifier for operating an electric machine in motor operating mode or in generator operating mode, includes a terminal for a control device that communicates with the pulse-width rectifier via a data connection. In order to safeguard the supply of energy in the case of a disturbance in the data transmission between the control device and the pulse-width rectifier, the pulse-width rectifier is constructed such that it automatically switches into an emergency generator operating mode in which it produces at its direct-voltage output a prespecified power with which it is possible to maintain at least an emergency operation of electrical consumers.

10 Claims, 1 Drawing Sheet

PULSE-WIDTH MODULATION RECTIFIER HAVING AN EMERGENCY GENERATOR OPERATING MODE

FIELD OF THE INVENTION

The present invention relates to a pulse-width modulation rectifier for operating an electric machine in motor operating mode or in generator operating mode, to a device for converting mechanical energy into electrical energy, and to a method for operating a pulse-width modulation rectifier in a hybrid vehicle.

BACKGROUND INFORMATION

In addition to the internal combustion engine, hybrid vehicles standardly have an electric motor that is operated either in a motor operating mode or in a generator operating mode, as a function of the driving situation. In motor operation, the electric motor produces an additional drive torque that supports the internal combustion engine, e.g. during an acceleration phase. In the generator operating mode, the kinetic energy that is released during deceleration of the vehicle is converted into electrical energy (recuperation). The electrical energy obtained in this manner is stored in an energy storage device, such as a battery or a super capacitor, and can be used in other driving situations, for example to propel the vehicle or to supply electrical consumers with energy. In this manner, the efficiency of the vehicle can be significantly improved.

Certain conventional pulse-width modulation rectifiers (PWR) standardly contain a power electronics stage as well as a computing core that is integrated into the PWR. The PWR is controlled by an external control device that calculates a target operating point for the internal combustion engine and for the electric motor as a function of the driver's wishes (acceleration or braking). The pulse-width rectifier is connected to the control device and receives the corresponding operating data or control commands from this device.

FIG. 1 shows a section of an electrical system of a hybrid vehicle. The system includes an electric machine 1 having a pulse-width rectifier 2 that is capable of operating electric machine 1 in motor operating mode or in generator operating mode. In motor operating mode, electric machine 1 supports the internal combustion engine; in generator operating mode, electrical energy is produced that is stored in an energy storage unit, here a battery 3.

Electric machine 1 and battery 3 are connected to one another via pulse-width rectifier (PWR) 2. PWR 2 determines the power level and operating mode of electric machine 1 and is correspondingly controlled by a control device 6.

Pulse-width rectifier 2 contains its own power electronics system, as well as a computing device, and is connected to external control device 6 via a CAN bus 4. Control device 6 determines the driver's wishes (e.g. braking or acceleration) and communicates corresponding items of information or control commands to pulse-width rectifier 2. Here, in particular the state of charge (SOC) of energy storage device 3 is also taken into account so that this device will not be overcharged during generator operation.

Pulse-width rectifier 2 and control device 6 are connected to terminals 15, and are standardly switched on through actuation of the ignition lock (KL15).

Certain conventional pulse-width rectifiers 2 are constructed such that when there is a disturbance in the communication connection (CAN bus 4) they switch to a safe state in which electrical energy is no longer produced. This prevents pulse-width rectifier 2 from overcharging energy storage device 3 during generator operation. However, in this safe state no electrical energy is produced at all, so that energy storage device 3 will become discharged relatively quickly given a large number of connected consumers. In this manner, the vehicle can "die" after a relatively short time.

SUMMARY

Example embodiments of the present invention ensure the supply of energy to the vehicle electrical system even when there is a disturbance in the communication connection between the pulse-width rectifier and the control device, and simultaneously to prevent overcharging of the energy storage device.

An aspect of example embodiments of the present invention is to construct the pulse-width rectifier such that when there is an error in the data or communication connection it switches automatically to an emergency generator operating mode in which the generator produces a prespecified electrical power, provided by the PWR at its direct-voltage output. This power is preferably dimensioned to cover at least an average power level of particular permanent consumers, such as control devices and sensors, that are important for the vehicle's ability to operate. In this manner, the vehicle continues to be able to be operated, so that the driver can at least find a service station.

The power produced in emergency operating mode is for example between 100 W and 500 W, preferably approximately 300 W.

According to an example embodiment of the present invention, when there is a failure of the communication connection the driver is alerted to this error, and is prompted to look for a service station. In order to inform the driver, for example an optical or acoustic device can be provided.

The pulse-width rectifier preferably has a first terminal for a data bus (CAN) to the control device and a second terminal for a control line to which the control device can also be connected. The second terminal is preferably a pure control terminal (on/off) via which the electric motor can be activated or deactivated. The higher-order control device is thus capable of controlling the pulse-width rectifier even when there is a disturbance in the communication connection, and in particular is able to switch it completely off. This can prevent the energy storage device of the vehicle electrical system from being overcharged during emergency generator operation.

The control device is preferably also connected to the energy storage device, and processes at least one state quantity, such as a current and/or voltage value of the energy storage device, on the basis of which the generator operating mode can be monitored. If excessively high voltages or currents, or other errors, are determined during generator operating mode, the control device can switch off the pulse-width rectifier via the additional control line. The control device is preferably connected to a sensor mechanism of the energy storage device via a bus connection.

The energy storage device preferably includes a state recognition system that determines the state of charge of the energy storage device and provides it to the control device. The state recognition system can be realized for example by a computing device having corresponding software that sends the state of charge to the control device, e.g. via the CAN bus. Optionally, the state recognition system can also be integrated into the control device. In this case, various electrical battery state quantities, such as terminal voltage and terminal current, are supplied to the control device, and the state of charge (SOC) of the battery is calculated therefrom.

In the following, example embodiments of the present invention are explained in more detail on the basis of the accompanying drawings.

DETAILED DESCRIPTION

Figure 1:
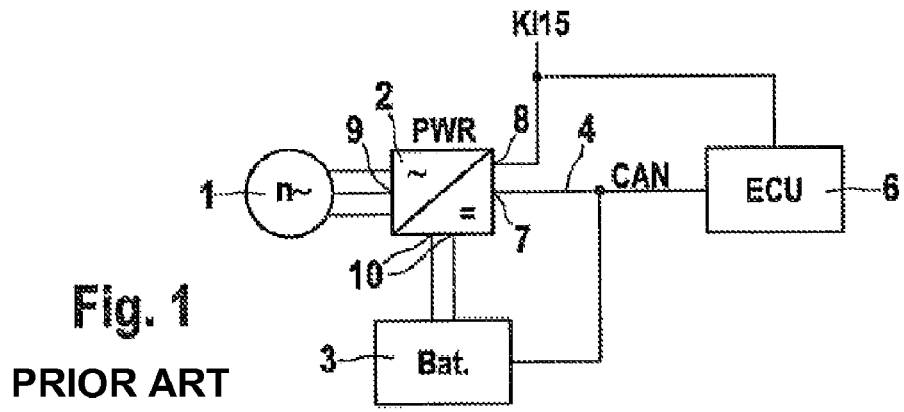
FIG. 1 shows a schematic view of a vehicle electrical system having an electric motor having a pulse-width rectifier and an associated control device according to the prior art.

With respect to the explanation of FIG. 1, reference is made to the introduction to the description above.

Figure 2:
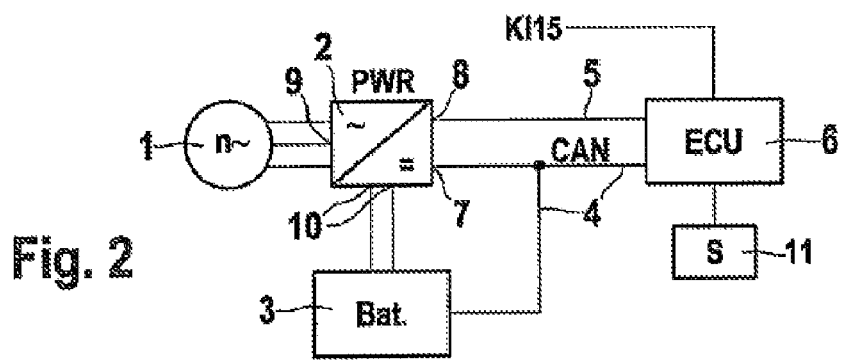
FIG. 2 shows a schematic view of a vehicle electrical system having an electric motor having a pulse-width rectifier and an associated control device according to an example embodiment of the present invention.

FIG. 2 shows a section of a vehicle electrical system of a hybrid vehicle, according to an example embodiment of the present invention. The system includes an electric machine 1 having a pulse-width rectifier 2 and an associated control device 6. Control device 6 evaluates the driver's wishes (acceleration or braking) and, as a function thereof, calculates target operating points for the internal combustion engine and electric machine 1. The depicted control device 6 can be for example the control device of the internal combustion engine. These target values are supplied to pulse-width rectifier 2 (in normal operation) via a CAN bus 4, which correspondingly operates electric machine 1 either in motor operating mode or in generator operating mode. In motor operating mode, electric machine 1 produces a drive torque that supports the internal combustion engine. In generator operating mode, pulse-width rectifier 2 produces at its direct-voltage output 10 a prespecified direct voltage that is used to charge energy storage device 3.

Pulse-width rectifier 2 is constructed such that when there is a disturbance of the data transmission via CAN bus 4, it automatically switches to an emergency generator operating mode, and in this operating mode provides a prespecified generator-produced power level. In this manner, at least the important electrical consumers, such as control devices, continue to be supplied with energy, and the vehicle remains capable of operation. When there is a disturbance in the data transmission, the driver is alerted to this error and is prompted to seek a service station. For this purpose, an optical or acoustic display device 11 is provided that is connected to control device 6 and is activated by it.

In addition, control device 6 is connected to energy storage device 3 and receives at least one electrical quantity, such as a current or voltage value, on the basis of which the emergency operating mode can be monitored. If there is an excessive increase in the network voltage or in the charge current, it is possible to deactivate the emergency operating mode. For this purpose, the control device is connected to pulse-width rectifier 2 via a separate control line 5. When there is a danger of overcharging energy storage device 3, control device 6 can switch pulse-width rectifier 2 on or off using a signal "low" or "high."

In the example shown, differing from FIG. 1, only control device 6 is connected to the ignition lock (KL15); PWR 2 is not so connected. Pulse-width rectifier 2 is switched on via control line 5.

Figure 3:
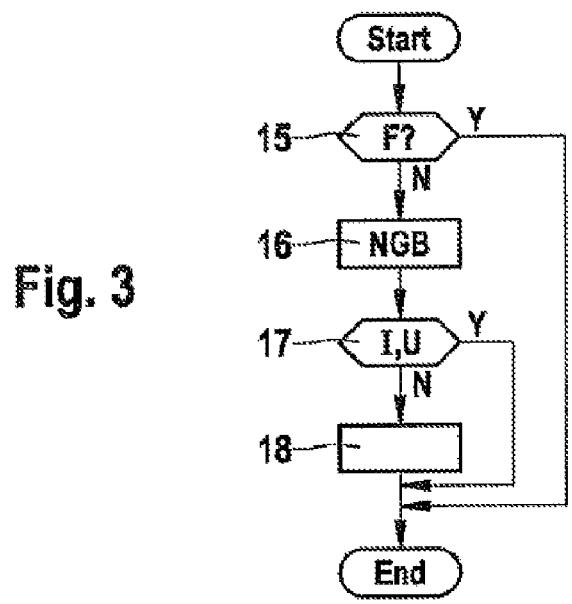
FIG. 3 shows method steps of a method for maintaining the supply of electrical energy in a vehicle electrical system, in the form of a flow diagram.

FIG. 3 shows steps of a method for maintaining the supply of energy when there is an error in communication system 4 between pulse-width rectifier 2 and control device 6. In this method, in a step 15 it is first checked whether data connection 4 between PWR 2 and control device 6 is functioning (for example by sending a confirmation query). If the functioning is in order (J), the method ends. If, in contrast, there is an error (N), pulse-width rectifier 2 goes into emergency generator operating mode (step 16). This takes place automatically whenever pulse-width rectifier 2 recognizes a malfunction in the data transmission. Emergency generator operating mode is indicated by a warning light 11 in the instrument panel, or by some other device.

In step 17, vehicle control device 6 monitors the charging of energy storage device 3, acquiring and processing the charge current and/or the charge voltage. If the emergency generator operating mode is functioning correctly, the method ends. If, in contrast, excessively high currents or voltages are determined (N), control device 6 is able to switch off pulse-width rectifier 2 via additional control line 5. For this purpose, control device 6 produces for example a signal "low" at the corresponding output.

What is claimed is:

1. A pulse-width rectifier for operating an electric machine in at least one of (a) a motor operating mode and (b) a generator operating mode, comprising:

a terminal for a data connection to a control device, the pulse-width rectifier configured to automatically switch to an emergency operating mode when there is a disturbance of the data connection; and a direct-voltage output;

wherein, when there is a disturbance in the data connection, the pulse-width rectifier provides at the direct-voltage output a prespecified power with which it is possible to maintain at least an emergency operation of electrical consumers.

2. The pulse-width rectifier according to claim 1, wherein power produced in emergency operating mode is between 100 W and 500 W.

3. The pulse-width rectifier according to claim 1, further comprising an additional terminal for the control device via which the pulse-width rectifier is deactivatable by the control device as needed.

4. The pulse-width rectifier according to claim 1, further comprising a first terminal for a bus and a second terminal for a control line to which the control device is connected.

5. A device for producing electrical energy in a vehicle electrical system, comprising:

an electric machine having a pulse-width rectifier that is connected between the electric machine and a direct-voltage vehicle electrical system, and that is connectable to a control device via a data connection, the pulse-width rectifier configured to automatically switch to an emergency operating mode when there is a disturbance in the data connection to provide a prespecified power at a direct-voltage output to maintain at least emergency operation of electrical consumers.

6. The device according to claim 5, wherein the pulse-width rectifier includes an additional terminal for the control device via which the pulse-width rectifier is deactivatable by the control device as needed.

7. The device according to claim 5, wherein the control device has a battery state recognition system.

8. The device according to claim 5, wherein the control device is configured to monitor at least one electrical quantity of an energy storage device and to control the pulse-width rectifier as a function of the electrical quantity.

9. A method for supplying of energy in a hybrid vehicle that has an internal combustion engine and an electric machine that is selectively operable in at least one of (a) a motor operating mode and (b) in generator operating mode, comprising:
- controlling the electric machine by a pulse-width rectifier that is connected to a control device via a data connection;
- monitoring a functioning of the data connection;
- in the case of a disturbance, switching the pulse-width rectifier into a safe emergency operating mode to produce at a direct-voltage output a prespecified power to maintain at least an emergency operation of electrical consumers.

10. The method according to claim 9, wherein in emergency operating mode, the control device monitors at least one electrical quantity of an energy storage device, and, as a function of the electrical quantity, at least one of (a) deactivates and (b) does not deactivate the pulse-width rectifier.

* * * * *